Oct. 17, 1933.  C. H. BOULIN  1,930,460
STROBOSCOPIC APPARATUS
Filed Sept. 3, 1931  7 Sheets-Sheet 1

INVENTOR-
Camille H. Boulin
BY
ATTORNEYS

Oct. 17, 1933.  C. H. BOULIN  1,930,460
STROBOSCOPIC APPARATUS
Filed Sept. 3, 1931   7 Sheets-Sheet 2

INVENTOR-
Camille H. Boulin
BY
ATTORNEYS

Oct. 17, 1933.                C. H. BOULIN                1,930,460
                         STROBOSCOPIC APPARATUS
                        Filed Sept. 3, 1931      7 Sheets-Sheet 4

INVENTOR-
Camille H. Boulin
BY
Cooper, Kerr & Dunlap
ATTORNEYS

Oct. 17, 1933.   C. H. BOULIN   1,930,460
STROBOSCOPIC APPARATUS
Filed Sept. 3, 1931   7 Sheets-Sheet 5

INVENTOR-
Camille H. Boulin
BY
Cooper, Kerr - Dunham
ATTORNEYS

Oct. 17, 1933.   C. H. BOULIN   1,930,460
STROBOSCOPIC APPARATUS
Filed Sept. 3, 1931   7 Sheets-Sheet 6

INVENTOR-
Camille H. Boulin
BY
Cooper, Kerr - Dunham
ATTORNEYS

Patented Oct. 17, 1933

1,930,460

UNITED STATES PATENT OFFICE 1,930,460

STROBOSCOPIC APPARATUS

Camille H. Boulin, New York, N. Y.

Application September 3, 1931. Serial No. 560,947

13 Claims. (Cl. 88—14)

This invention relates to stroboscopic apparatus.

Among the objects of the invention is to provide a novel unit having associated together a stroboscopic element in the form of a disk or drum, means for driving and for regulating the speed thereof and an optical system for directing illumination through the apertures of the stroboscopic element so as to enable the use of the apparatus under conditions of poor light. A further object of the invention is to provide means whereby the optical system may be altered so as to permit sighting through the apertures in the stroboscopic element when it is not necessary or desirable to make use of illumination.

The invention also involves among its objects the production of an efficient optical system capable of intensifying the brilliancy of illumination; provisions for adjusting the size of the spot of light thrown on an object whose speed is to be determined; heat conducting and conveying means enabling the use of a high powered lamp; an optical system convertible for use for transmitting a beam of light from the apparatus or for enabling sighting therethrough when illumination is not used; a small sized stroboscopic drum in which the apertures therein are spaced more closely to one another than has heretofore been possible; a stroboscopic drum having means for enabling the adjustment of the size of the apertures therein; stroboscopic disk and drum mountings for facilitating the substitution of one disk or drum for another; a conjointly operable mechanical and electrical motor speed controlling arrangement; motor controlling circuit means for adjusting the electrical characteristics of the circuit for enabling the motor for driving the stroboscopic member to be driven at the same speed on either alternating or direct current; means enabling ready access to the stroboscopic drum and optical system for permitting manual adjustment and alteration thereof; and a stroboscopic disk having several series of holes, each series having holes different in number from the other series and spaced concentrically therefrom in conjunction with an optical device tiltable so as to project a beam of light through the holes of one or another of the series of holes depending upon its position of adjustment.

With these and incidental objects in view, the invention consists of certain novel features of construction and combination of parts, the essential elements of which are set forth in the appended claims and a preferred form of embodiment of which is described hereinafter with reference to the drawings which accompany and form a part of the specification.

Figure 1:
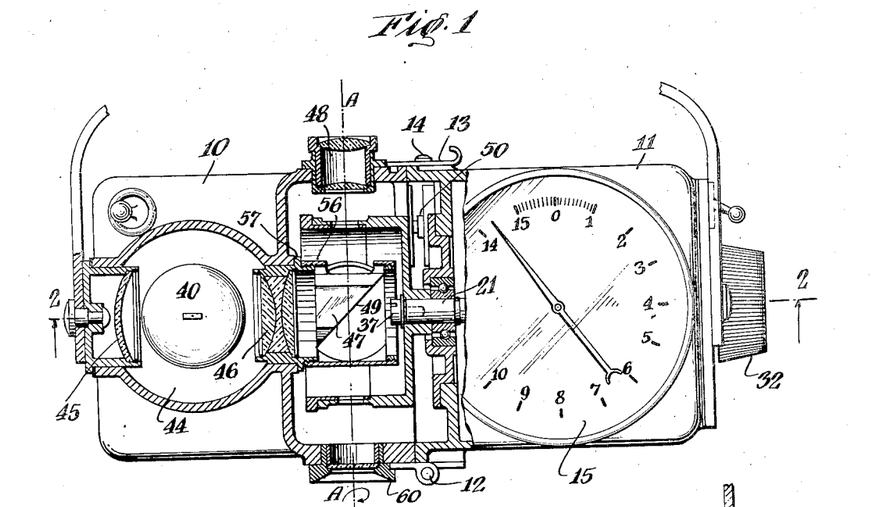
Fig. 1 shows a plan of the preferred form of stroboscopic apparatus with a portion thereof cut away to show the optical system in the interior thereof.
Figure 2:
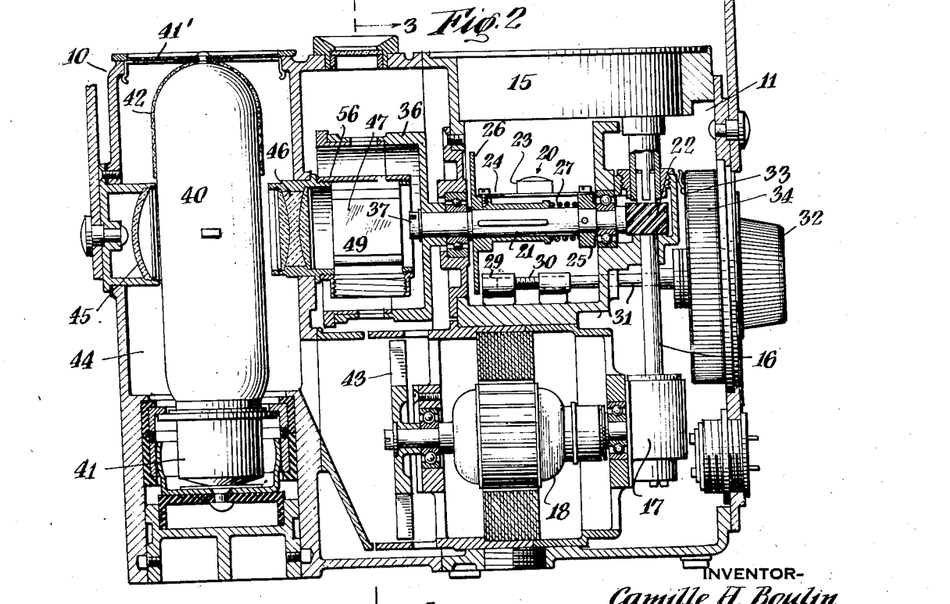
Fig. 2 is a vertical section of the stroboscopic apparatus on line 2—2 of Fig. 1.
Figure 3:
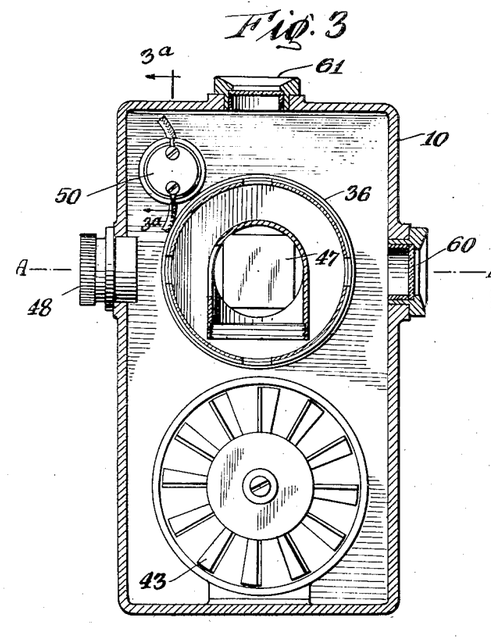
Fig. 3 is a vertical section of the stroboscopic apparatus on line 3—3 of Fig. 2.

In Figs. 1, 2 and 3 inclusive, I have shown the preferred form of the stroboscopic apparatus. All the elements of this apparatus are enclosed within a casing which is made up of two box-like parts 10, 11 which are hinged together at 12 and maintained in the relation shown by means of spring catch 13 extending from the box 10 and engaging with a pin 14 carried by box 11, Fig. 1. The various elements of the apparatus are so related to one another as to take up as little space as possible while at the same time adequately provide for efficiently accommodating various features of the invention. At the top of the box-like portion 11 there is a chronometric tachometer 15 which is connected through shaft 16 and gearing 17 with the armature 18 of the motor. This armature is mounted on bearings which are also carried by box-part 11. Also mounted in the same box-part is a governor 20 which rotates with a shaft 21 having direct connection by means of spiral gears 22 with shaft 16. The governor includes weights 23 mounted upon springs 24, each of which have one end connected to a hub 25 carried by shaft 21. The other ends of the springs 24 are connected to a disk 26 which is carried by shaft 21 but is free to move longitudinally thereof. The movement of disk 26 is restrained, in part, by compression spring 27 mounted between the hub of disk 26 and hub 25. As shaft 21 is rotated, the governor weights 23 cause the springs 24 to bend outwardly and draw disk 26 toward hub 25. Member 29 is a brake shoe adapted to contact with disk 26 for the purpose of limiting the speed of rotation of disk 26 and the motor. The brake shoe 29 is mounted so as to be positionable, at will, by a screw 30 at one end of the shaft 31. On the other end of the shaft there is a knob 32. Shaft 31 has also mounted thereon the movable finger 33 of a rheostat 34. This rheostat is used for controlling the speed of the motor. Reference will be made hereinafter to the speed control of the stroboscopic drum and motor in connection with the wiring diagram illustrated in Fig. 21.

On the left end of shaft 21, Figs. 1 and 2, there is mounted the stroboscopic drum 36. This drum may be provided with light apertures in the number of one, two, four, six, eight, sixteen, thirty-two, etc., depending upon the use of the apparatus and the speed of the rotating device whose speed is desired to be ascertained. As is well understood, although the speed limit of the motor may be such as to enable the use of one apparatus for determining the speeds of a wide range of speeds of rotating devices the usefulness of the apparatus may be increased by varying the number of light apertures in the stroboscopic element. While stroboscopic drums having different numbers of apertures therein may be provided, it will be ordinarily sufficient to utilize drums having one, two or four openings and since the same principles enter into the operation and design, it is not necessary to illustrate the use of more apertures. If the tachometer of an instrument so equipped is graduated to read directly when a drum having but one aperture is used, the speed reading of the tachometer must be multiplied by two when a drum having two apertures is used and must be multiplied by four if a drum having four apertures is used, in order to get the correct speed reading.

One of the features of my invention is to facilitate the interchanging of drums having different numbers of apertures therein, and for this purpose it is necessary only to separate the box-parts 10, 11 by pivoting them on hinge 12 and then remove the drum 36 by removing screw 37, Fig. 1. The relation of the box-parts 10, 11 and drum is such that the box-parts may be fully opened on their hinge so as to permit replacement of one drum for another. I also contemplate a design of drums which makes it unnecessary for removing the entire drum and these will be discussed hereinafter with other details of the apparatus.

The box portion 10 contains the optical and illuminating systems. The source of illumination consists of a lamp 40 mounted in a socket 41 near the bottom of the box. A preferable lamp has a straight filament and is of the kind used with projection apparatus. The upper end of box above the lamp is open except for a wire screen 41' to which is connected a wire cap 42 fitting over the upper end of the lamp. These metallic screens assist in the radiation of heat from the lamp, and a fan 43 is provided for causing a draught of air to flow upwardly through chamber 44 and about the lamp.

The optical system for causing a beam of light to be directed upon the object to be observed, consists of a reflector 45, condensing lens 46, prism 47 and a projector 48. The projector 48 is adjustible in its support for focusing and adjusting the size of the beam of light projected upon the moving object. While different types of lamp filaments may be used, when a filament of the point type, that is, one equal in height and width, is used, the reflector 45 should be of the spherical type for most efficient reflection. The filament is at the focus of the reflector and the rays of light which emanate from the filament and reflector pass through the prism and are reflected from surface 49 through successive apertures of stroboscopic element 36 and projector 48. As is well understood, spaced apertures on drum 36 cause the light to be intermittently passed through projector 48.

Figure 3A:
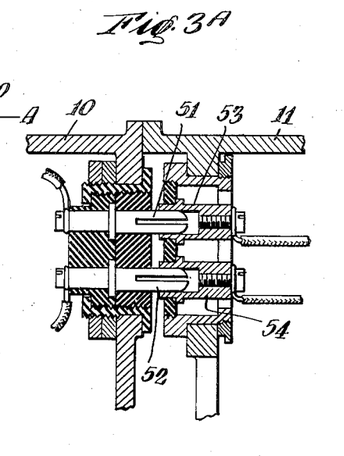
Fig. 3A is a detail of the lamp circuit switch.
Figure 4:
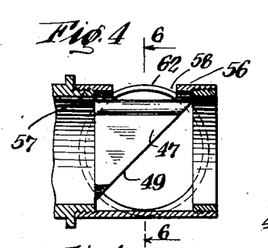
Fig. 4 is an enlarged view of the prism and mounting therefor shown in the position it appears in Fig. 1.
Figure 5:
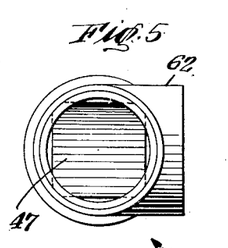
Fig. 5 is a view of the prism and mounting therefor looking from the right side of Fig. 4.
Figure 6:
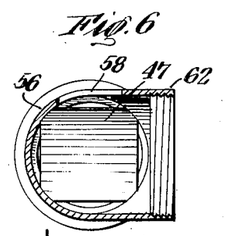
Fig. 6 is a section of the prism and mounting therefor on line 6—6 of Fig. 7.
Figure 7:
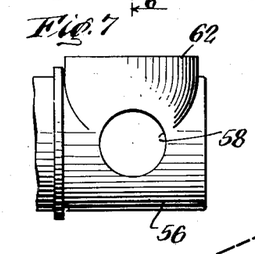
Fig. 7 is a view of the prism and mounting therefor as seen from above Fig. 4.

It will be apparent from an inspection of Fig. 1 that the user of the instrument may have the instrument before him and so positioned as to train the flashing light emitted through projector 48 onto a rotating part of a machine and observe the effect of the light while noting the reading of the tachometer. In Fig. 3 there is illustrated a switch 50 for the lamp 40. This switch is shown in detail in Fig. 3A and comprises a pair of plugs 51, 52 adapted to enter sockets 53, 54. Plugs 51, 52 are carried by the box-part 10 and sockets 53, 54 are carried by the box-part 11. When the two box members are separated, the lamp circuit is automatically opened and the lamp extinguished.

Having reference particularly to Figs. 4, 5, 6 and 7 the mounting for the prism 49 is so designed that the prism may be removed whenever it is desired to sight through the instrument when not making use of illumination. This prism is mounted in a sleeve 56 which is threaded at one end for engagement with a collar 57. The sleeve is apertured at 58 for permitting light to pass from reflecting surface 49. When the instrument is to be sighted, the prism sleeve 56 is removed from collar 57 and a clear line of vision is permitted between eye piece 60 and projector 48, Fig. 3.

Figures 8, 9:
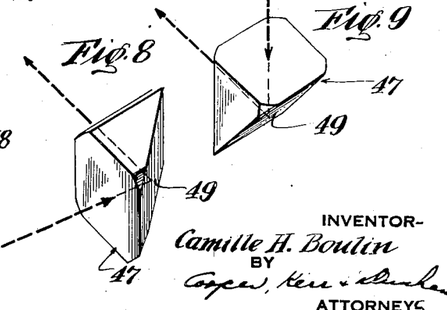
Figs. 8 and 9 show the relative positions of the prism when used for different purposes.

The tachometer dial is on the top of the box and it is, therefore, convenient to sight through the instrument and observe the tachometer reading at the same time. This may be done when a stroboscopic drum having four apertures is used and by the use of an eye piece 61 at the top of the box. When observations are to be made through this eye piece the prism must be mounted upon collar 57 in such a manner as to permit reflection from surface 49 in the manner illustrated in Fig. 9. For this purpose one side of the sleeve 56 is provided with an opening and a collar 62 interiorly threaded for engagement with collar 57. In Fig. 8 I have illustrated the position of the prism when it is used for reflecting illumination from the filament through projector 48. This position corresponds to the position of the prism illustrated in Fig. 1. In Fig. 9 I have shown the relative position of the prism when the object to be observed is being sighted through eye-piece 61 in the top of the casing. The position of the prism in Fig. 9 is obtained by rotating the same 90 degrees about the axis A—A, Fig. 1, and engaging collar 62 with collar 57.

By using a prism capable of reflecting at an angle of 90 degrees, I am enabled to use a stroboscopic drum no larger than necessary to accommodate the prism. Hence, the spaces between the apertures in the wall of the drum are relatively close together so that the time elapsed between flashes of light through successive apertures is relatively short and a blurred impression is avoided because of the minimum of time elapsed between flashes of light.

Figure 10:
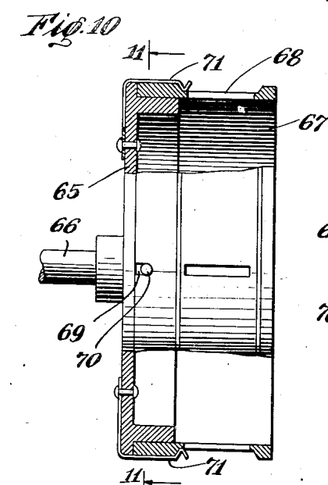
Fig. 10 shows a section on line 10—10 of Fig. 11 showing a hub and removable stroboscopic drum.
Figure 11:
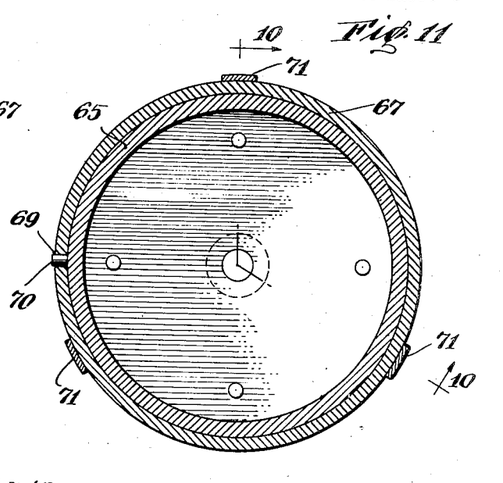
Fig. 11 is a section on line 11—11 of Fig. 10.

In Figs. 10 and 11 I have illustrated a hub member 65 which is mounted to rotate with shaft 66. The hub member is adapted to receive any one of a plurality of interchangeable stroboscopic elements 67 having apertures 68 therein. Each of the interchangeable stroboscopic elements is provided with a slot 69 for justifying the position of the element upon the hub. The slot is engaged by a pin 70 extending from the hub, and this pin and slot engagement serves to prevent relative rotary motion between the element and hub. A spring 71 maintains the element upon the hub and may be readily released when it is desired to remove an element from the hub. It is to be understood that the interchangeable disks are provided with different numbers of equally spaced light apertures. The element illustrated in Fig. 10 has four apertures but other elements which are interchangeable with the element illustrated, are provided with one, two, eight, sixteen and thirty-two, etc., apertures.

Figures 12, 13, 14:
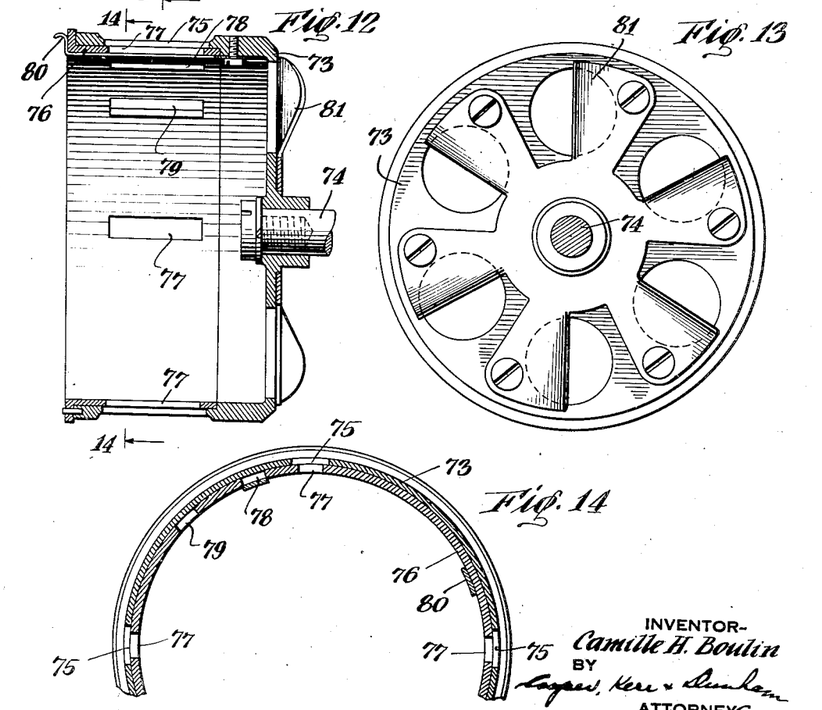
Fig. 12 is a sectional view of a stroboscopic drum having propeller blades and openings for ventilation.
Fig. 13 is an outside view of the drum shown in Fig. 12 looking from the right.
Fig. 14 is a section of a portion of the drum shown on line 14—14 of Fig. 12.

In Figs. 12, 13 and 14 I have shown another modified form of a stroboscopic element. This element comprises a drum 73 mounted in fixed relation to shaft 74. The drum is provided with a plurality of equally spaced apertures 75, for example, four in number. Another drum 76 is mounted so as to be carried by and within drum 73. Drum 76 is provided with four apertures 77 adapted to register with the four apertures 75 of drum 73. It is also provided with additional apertures 78 and 79. The two apertures 78 are diametrically opposite one another and by rotating drum 76 these may be brought into registration with a pair of apertures 75 for the purpose of providing a stroboscopic element having but two apertures. Further rotation of drum 76 in respect to drum 75 enables aperture 79 to be brought into registration with one of the apertures 75 in drum 73 and thereby provide a stroboscopic element having but one aperture in its periphery. Spring elements 80 retain the two drums in nested relation as illustrated in Fig. 12. For the purpose of assisting in maintaining ventilation within the apparatus casing, drum 73 may be provided with a plurality of blades 81 which propel air through the drum as the drum is rotated.

Figure 15:
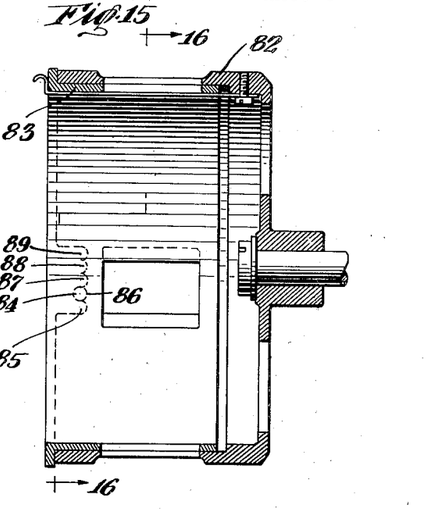
Fig. 15 shows a section of a stroboscopic drum mounting which is provided with means for enabling adjustments in widths of the light apertures.
Figure 16:
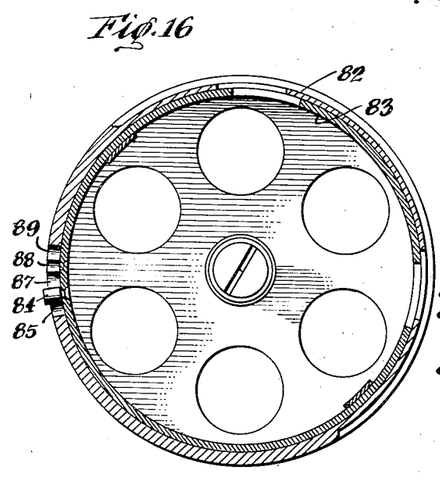
Fig. 16 is a section on line 16—16 of Fig. 15.

In Figs. 15 and 16, I have illustrated the stroboscopic element comprising a pair of apertured drums, 82, 83. These drums are settable in different angular positions in respect to each other, and they are maintained in any set position by means of a pin 84 capable of engaging any one of grooves 85, 86, 87, 88 and 89 in the edge of the drum 82. The relation of the pin in respect to the different grooves is such as to create different sizes of openings defined by the opposite apertures in the respective drums. As illustrated, pin 84 is in engagement with groove 86 and in this position the aperture is four-fifths of its possible maximum size.

Figures 17, 17A:
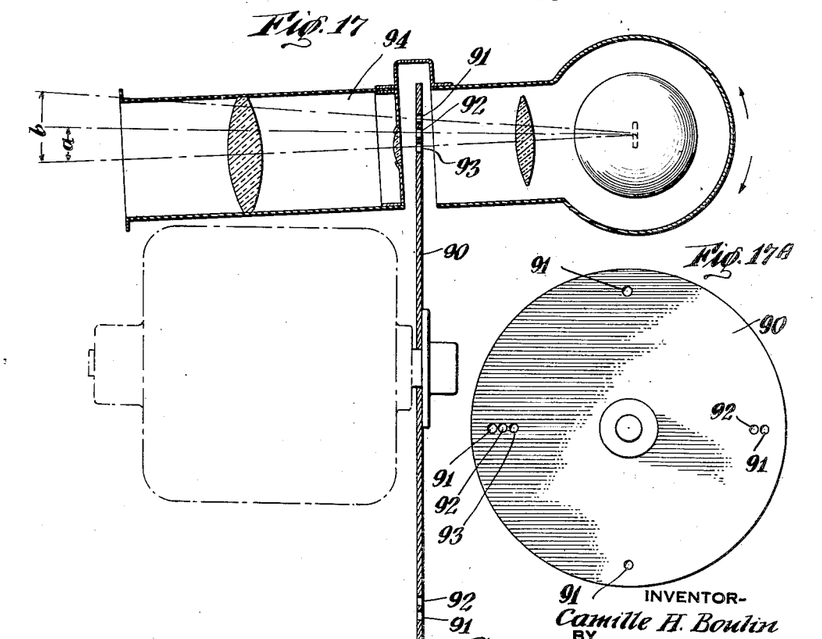
Fig. 17 is a diagrammatic view of an optical illumination system associated with a stroboscopic disk having concentric rows of apertures.
Fig. 17A is a face view of the disk shown in Fig. 17.

In Figs. 17 and 17A, I have illustrated a stroboscopic element in the form of a disk 90 having a plurality of series of apertures arranged concentrically in respect to each other. One series of apertures has four apertures 91. A second series of apertures has two apertures 92, and another aperture 93 is spaced from the two series of apertures 91 and 92. In this stroboscopic element I am enabled to make observations for four different speeds of rotating parts without changing the stroboscopic element or the speed thereof. I accomplish this by utilizing an optical system which is tiltably mounted for projecting a beam of light to intersect any one of the three series of apertures 91, 92 and 93. Having reference to Fig. 17, a position of the optical system 94 in respect to the stroboscopic element 90 is such as to project a beam of light in the path of apertures 93. By tilting the optical system through angle $a$ or $b$ light may be projected in the path of apertures 92 or in the path of apertures 91, as desired.

Figure 18:
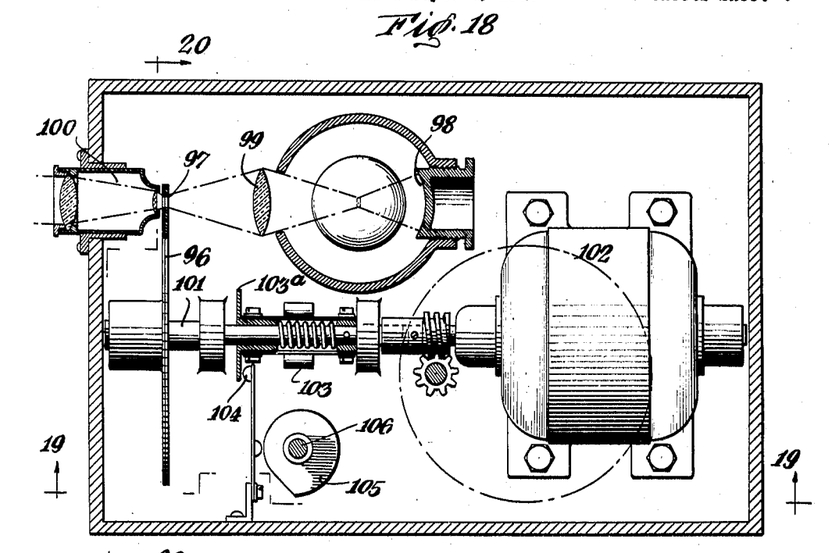
Fig. 18 is a sectional view of a modified form of stroboscopic apparatus on line 18—18 of Fig. 19.
Figure 19:
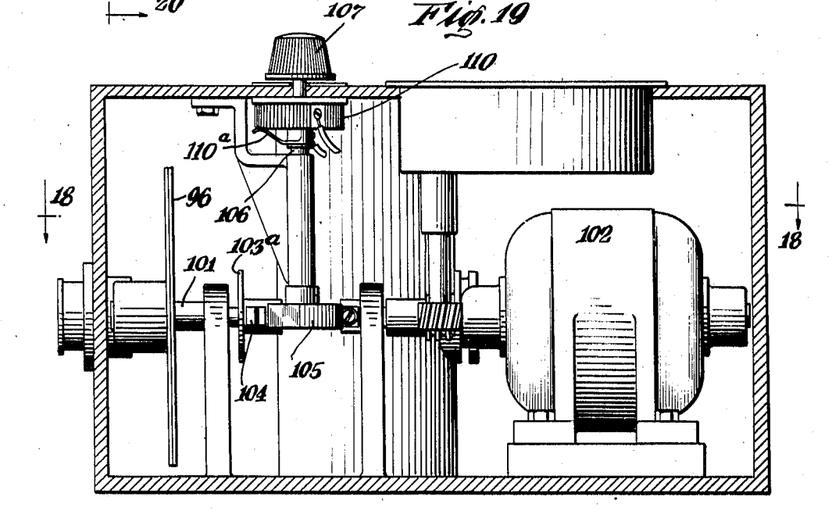
Fig. 19 is a sectional view of the stroboscopic apparatus illustrated in Fig. 18 on line 19—19 of Fig. 18.
Figure 20:
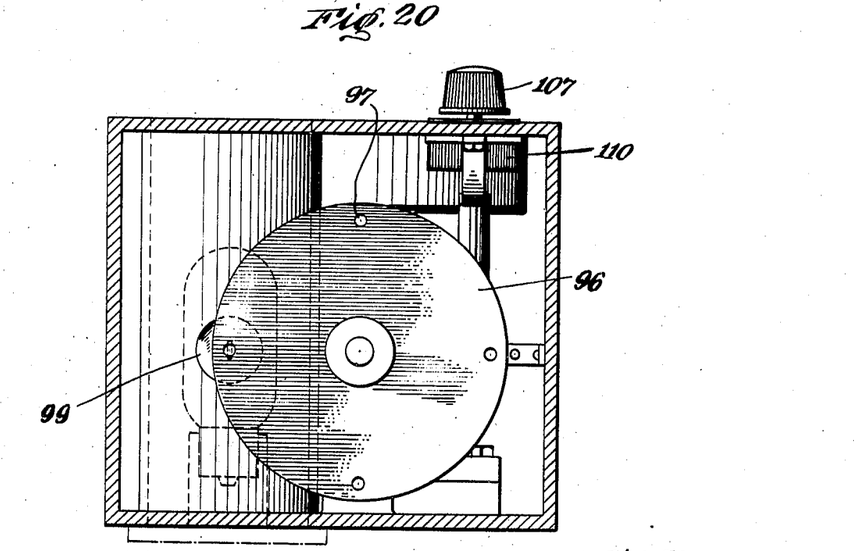
Fig. 20 is a sectional view on line 20—20 of Fig. 18.

In Figs. 18, 19 and 20, I have illustrated a stroboscopic apparatus having a stroboscopic element in the form of a disk 96 and an optical system for directing a beam of light through the apertures of the disk. It is to be understood that the optical system is so designed as to concentrate the light passing through the apertures 97 of the disk so as to obtain the greatest intensity possible. For this purpose, a lamp having a point-filament is preferable so that the filament may be placed in the focus of a spherical reflector 98. The condensing lens 99 concentrates the light emitted from the filament to the size of aperture 97, and projector 100 is provided for focusing the beam of light along the moving part whose speed is to be measured. For this purpose the projector is slidably mounted in its sleeve support.

The shaft 101 of the stroboscopic element is aligned with the shaft of motor 102 and carries the speed-governing device 103. This device operates similar to the one illustrated in Fig. 2 and is likewise provided with a braking disk 103$a$ which is adapted to contact with a friction member 104 mounted upon a spring support. The position of the friction member 104 is determined by a cam 105 mounted upon shaft 106 which may be turned by means of knob 107.

Figures 21, 22, 23:
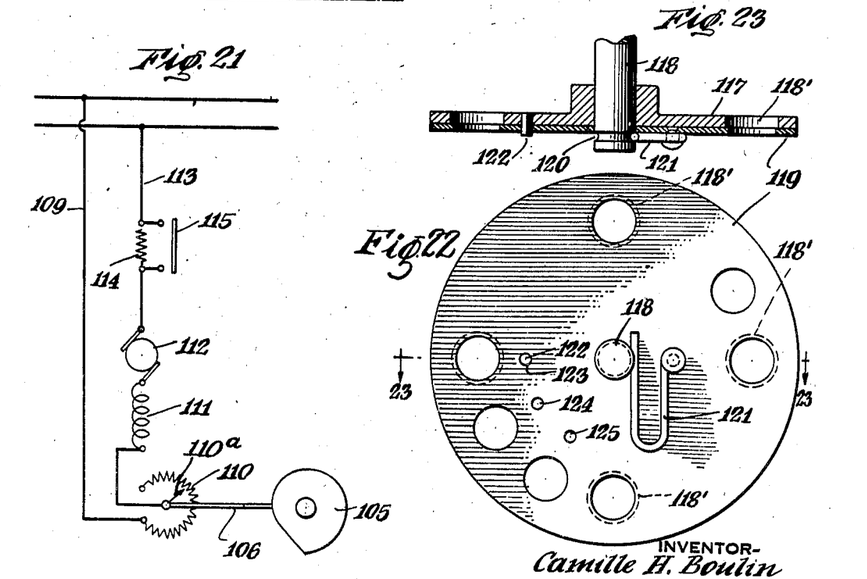
Fig. 21 shows the motor controlling circuit diagram and speed controlling means for the motor.
Fig. 22 shows a simple mounting enabling the ready positioning of a stroboscopic disk.
Fig. 23 is a section on line 23—23 of Fig. 22.

In Fig. 21, I have illustrated the circuit controlling means for controlling the operation of the motor. This circuit includes line 109, rheostat 110, field winding 111, motor 112 and line 113. A resistance 114 is included in line 113 for cutting down the speed of the motor when it is desired to run the motor on direct current. A shunt member 115 is provided for shunting the resistance when the motor is to be run on alternating current. The electric characteristics of resistance 114 is such as to enable the motor to be operated on direct current at the same speed as on alternating current when the resistance is in circuit for direct current operation and out of circuit for alternating current operation.

The rheostat control finger 110a and cam 105 are mounted on the same shaft 106 so as to be conjointly operable to vary the speed of the motor, but the relation is such that the mechanical brake is effective to control the speed before the speed of the motor is reduced by the rheostat. By differently positioning cam 105, and hence the position of friction member 104, the speed of the motor may be controlled mechanically. By operating the rheostat through shaft 106, the amount of current transmitted to the motor may be reduced when the mechanical braking device is positioned to maintain a low speed of rotation of the motor. This arrangement enables the stroboscopic apparatus to be used for measuring the speeds of slowly rotating parts without the possibility of burning the motor. The same circuit controlling means is utilized in the stroboscopic apparatus illustrated in Figs. 1, 2 and 3 and the mechanical braking device consisting of shoe 29, and disk 26 bears the same relation to the rheostat 34 and motor as just described.

In Figs. 22 and 23 I have illustrated the stroboscopic element comprising an aperture disk 117 mounted in fixed relation upon shaft 118. Disk 117 has four apertures 118' equally spaced. A second disk 119 has a central aperture to fit over the end of shaft 118 which is grooved at 120 for engagement by spring 121 carried by disk 119. Disk 119 may occupy any one of three positions relative to disk 117 which positions are determined by pin 122 and openings 123, 124 and 125 in disk 119. Disk 119 is so apertured as to leave four openings in the stroboscopic element when pin 122 engages hole 123; to leave two apertures in the stroboscopic element when pin 122 engages hole 124; and to leave but one aperture in the stroboscopic element when pin 122 engages hole 125. The pin and its associated holes definitely determine the three positions of irregularity of the disks in respect to one another.

Figure 24:
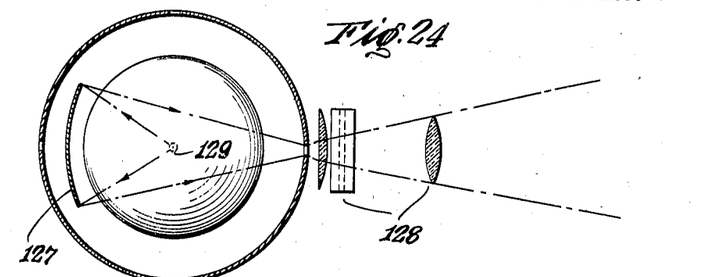
Fig. 24 is a plan of an optical system permitting the use of a multi-apertured stroboscopic drum and a lamp at its axis.
Figure 25:
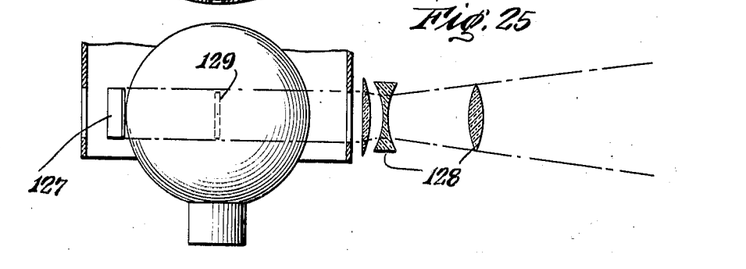
Fig. 25 is a view through the axis of the optical system of Fig. 24.
Figure 26:
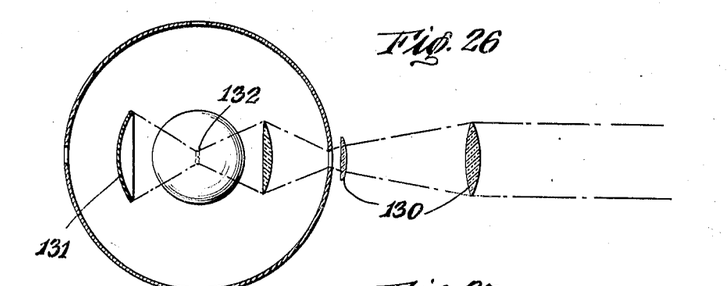
Fig. 26 is a plan of an optical system similar to that of Fig. 24 but utilizing a special deflector.
Figure 27:
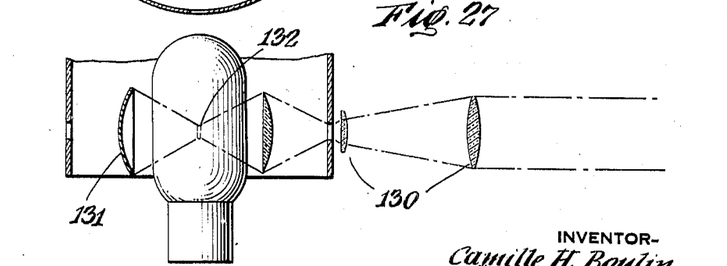
Fig. 27 is a view through the axis of the optical system of Fig. 26.

In Figs. 24, 25, 26 and 27 I have shown how the optical systems may be utilized in connection with a stroboscopic apparatus in which the lamp and reflector are mounted within a stroboscopic drum. The reflector 127 and lenses 128 in Figs. 24 and 25 are designed for a vertically disposed filament 129. The lenses 130 and spherical reflector 131, Figs. 26 and 27 are suitable for a point or round filament, such as at 132.

My invention is capable of a wide variation and relationship of parts without departure from the nature and principle thereof and I do not restrict myself unessentially in the foregoing or other particulars, but contemplate such alterations and modifications within the scope of the appended claims as may be found to be advisable.

I claim:—

1. In a stroboscopic apparatus, the combination comprising a casing having two box-like members hinged together with their open sides opposite each other, a motor and a governor therefor mounted in one of said box-like members, a stroboscopic element driven by said motor, a lamp mounted in the other of said box-like members, and optical means for directing light from said lamp through apertures in said stroboscopic element.

2. In a stroboscopic apparatus, the combination comprising a casing having two box-like members hinged together with their open sides opposite each other, a motor and a governor therefor mounted in one of said box-like members, a stroboscopic element driven by said motor, a lamp mounted in the other of said box-like members, and optical means for directing light from said lamp through apertures in said stroboscopic element, said optical means comprising reflecting means disposed within said stroboscopic element, and a condensing lens intermediate said reflecting means and said lamp.

3. In a stroboscopic apparatus, the combination comprising a casing having two box-like members hinged together with their open sides opposite each other, a motor and a governor therefor mounted in one of said box-like members, a stroboscopic drum driven by said motor, said drum being disposed in the other of said box-like members, a lamp and optical system carried in said last named box-like member, said optical system comprising a reflecting member disposed within said stroboscopic drum, a condensing lens intermediate the reflecting member and lamp, and a projector in the wall of the casing.

4. In a stroboscopic apparatus, the combination comprising a rotary mounting for a stroboscopic element, a stroboscopic element on said mounting, said element having a plurality of concentrically placed series of apertures, each series differing in number of apertures from another, a source of light for projecting a beam of light to intersect one or another of the series of apertures, and an angularly adjustable optical system positionable to direct a beam of light from said source of light so as to intersect one or another of the series of apertures in the stroboscopic element.

5. In combination, stroboscopic apparatus for measuring the speed of a rotating body, comprising a casing, two box-like members hinged together with their open sides opposite each other, a stroboscopic element, means for rotating said element, said means being mounted in one of said box-like members, means for indicating the speed of said stroboscopic element, said means being disposed in the wall of said box-like member, a lamp mounted in the second box-like member, air circulating means mounted in the first box-like member, and partitions forming a passageway for delivering air from said last named means to the base of the lamp contained in said second box-like member.

6. In combination, stroboscopic apparatus for measuring the speed of a rotating body, comprising a casing having two box-like members hinged together with their open sides opposite each other, motor means mounted in one of said box-like members, a stroboscopic drum driven by said motor means, an aperture in the wall of said casing opposite the exterior surface of said drum, a lamp mounted in said casing at the end of said stroboscopic drum, and a reflector disposed within said stroboscopic drum and so positioned as to continually reflect the light from said lamp in the direction of the aperture in said casing.

7. In combination, a stroboscopic apparatus for measuring the speed of a rotating body, comprising a casing, a stroboscopic drum, a shaft extending from one end of said drum, means for rotating said shaft and drum, a lamp disposed beyond the end of said drum, a lens mounted in the wall of said casing opposite said stroboscopic drum, reflecting means carried by said casing and extending into said drum, said reflecting means being so positioned as to reflect light from said lamp through said drum and lens, and an eye piece in the wall of said casing opposite the wall containing said lens, said eye piece being axially disposed in respect to said lens.

8. In combination, a stroboscopic apparatus for measuring the speed of a rotating body, comprising a casing, a stroboscopic device, means for rotatively mounting said device within said casing, said device comprising a drum having a set of apertures in its wall, a second drum telescopically mounted on said first named drum and having a set of apertures spaced to correspond with the positions of the apertures in said first named drum and additional apertures to register with certain apertures in said first named drum when the drums are engaged in a position circumferentially displaced from the first named relation, and locking means for maintaining the two drums in locked relation, but permitting removal of the second drum at will.

9. In combination, a stroboscopic apparatus for measuring the speed of a rotating body, comprising a casing, said casing consisting of two box-like members hinged together, a stroboscopic drum rotatively mounted in one of said box-like members, said stroboscopic drum being mounted in such a manner as to be accessible when said casing is opened, a rotary mounting for said stroboscopic drum, and means for locating said stroboscopic drum in a definite position relative to said rotary mounting.

10. In combination, a stroboscopic apparatus for measuring the speed of a rotating body, comprising a rotary stroboscopic device, said device comprising a drum having a set of apertures therein, a second drum engaging said first named drum and having a set of apertures spaced to correspond with the position of the apertures of said first named drum, and means for locating said drums in different positions relative to each other, said means comprising a pin in one of said drums adapted to engage one or another of said grooves in the other of said drums, spaced fractional portions of the opening of a single aperture.

11. In combination, a stroboscopic apparatus for measuring the speed of a rotating body, comprising a rotary stroboscopic device, said device comprising a drum having apertures therein, a hub-like member supporting said drum, said hub-like member having openings for permitting the passage of air through the drum, and a plurality of blades attached to the hub-like member adjacent the openings therein whereby air is propelled through the drum as the drum is rotated.

12. In combination, a stroboscopic apparatus for measuring the speed of a rotating body, comprising a rotary stroboscopic device, said device comprising a drum having apertures therein, means for supporting said drum for rotation about the axis thereof, said means being provided with openings permitting the passage of air axially along the interior of the drum, and a plurality of blades for propelling the air through said openings.

13. In combination, a stroboscopic apparatus for measuring the speed of a rotating body, comprising a casing having an opening for emitting light flashes, a rotary stroboscopic drum having openings for the passage of light, said drum being open at one end and supported at its other end by a hub and flange, a source of light disposed in said casing beyond the open end of said drum, and air propelling means carried by said drum for delivering air to the light source in a path axially of said drum.

CAMILLE H. BOULIN.